United States Patent [19]
Honda

[11] Patent Number: 6,044,309
[45] Date of Patent: Mar. 28, 2000

[54] THREE-DIMENSIONAL MACHINING METHOD AND RECORDING MEDIUM STORED WITH A THREE-DIMENSIONAL MACHINING CONTROL PROGRAM

[75] Inventor: Kenichi Honda, Osaka, Japan

[73] Assignee: Kabushiki Kaisha F A Labo, Osaka, Japan

[21] Appl. No.: 08/963,267

[22] Filed: Nov. 3, 1997

[30] Foreign Application Priority Data

Nov. 7, 1996 [JP] Japan ................................. 8-295417

[51] Int. Cl.$^7$ .............................................. G05B 19/4099
[52] U.S. Cl. ........................................... 700/187; 700/163
[58] Field of Search .................................. 318/569, 570; 700/163, 174, 182, 187

[56] References Cited

U.S. PATENT DOCUMENTS

| | | | |
|---|---|---|---|
| 5,369,592 | 11/1994 | Honda ................................ | 364/474.29 |
| 5,515,290 | 5/1996 | Honda ................................ | 700/187 |
| 5,627,771 | 5/1997 | Makino .............................. | 364/474.29 |
| 5,631,840 | 5/1997 | Ooka et al. ........................ | 364/474.24 |

*Primary Examiner*—Paul P. Gordon
*Assistant Examiner*—Kidest Bahta
*Attorney, Agent, or Firm*—Burns, Doane, Swecker & Mathis, LLP

[57] ABSTRACT

Data about a plurality of curved surfaces which are expressed in various forms are inputted, and based on the inputted data, the curved surfaces are defined by a set of rational functions with respect to parameters u and v. Then, calculation for intersections which are necessary for machining is carried out, and paths of a cutting tool are calculated. In figuring out the solution of the set of rational functions, first, the extremal value and the point of inflection are calculated, and the solution is calculated by an analytically focusing method with the initial value set between the extremal value and the point of inflection. When a plurality of curved surfaces are expressed in the same form, the curved surfaces are unified into a single surface.

4 Claims, 5 Drawing Sheets

F I G. 1
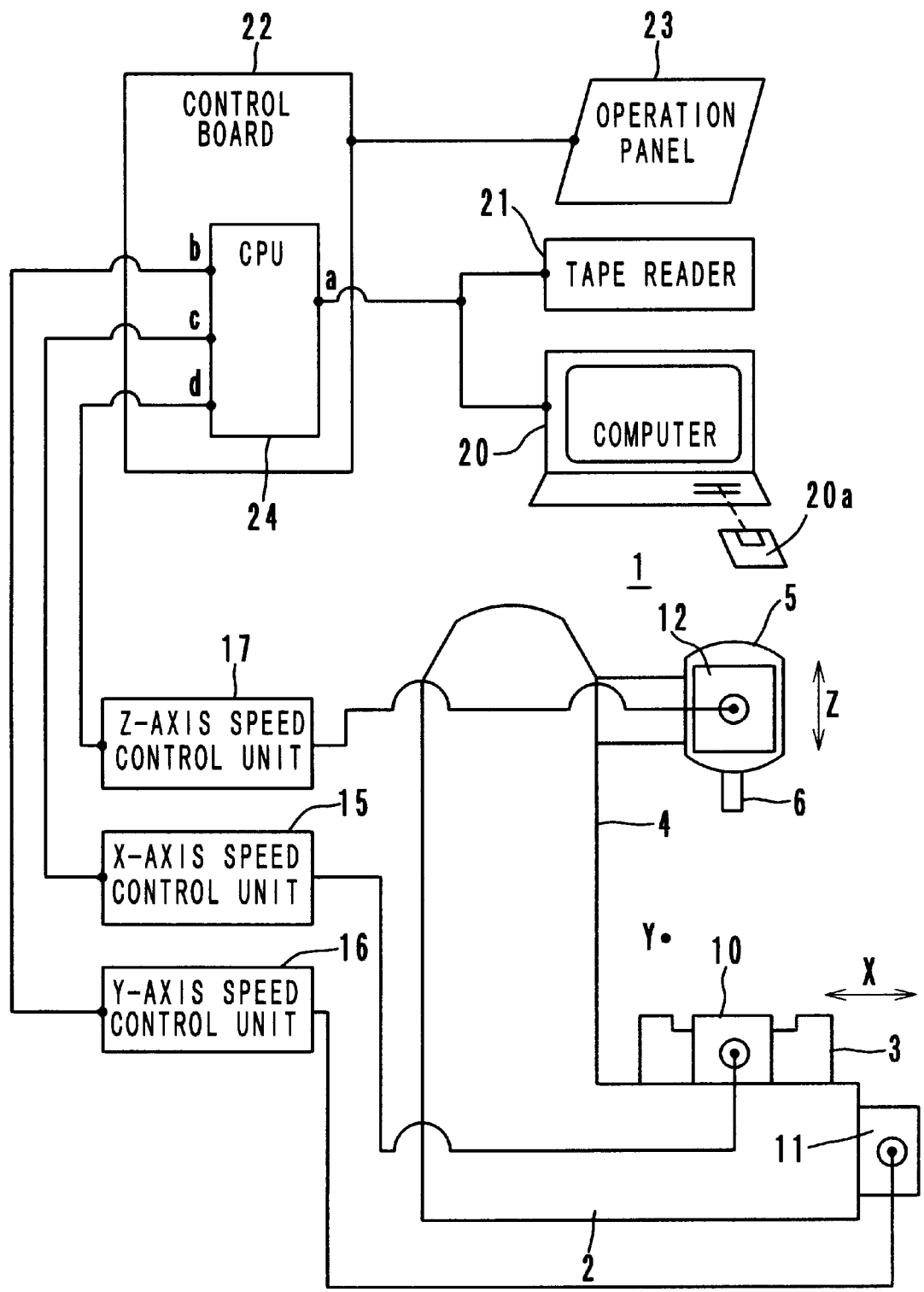

F I G. 6
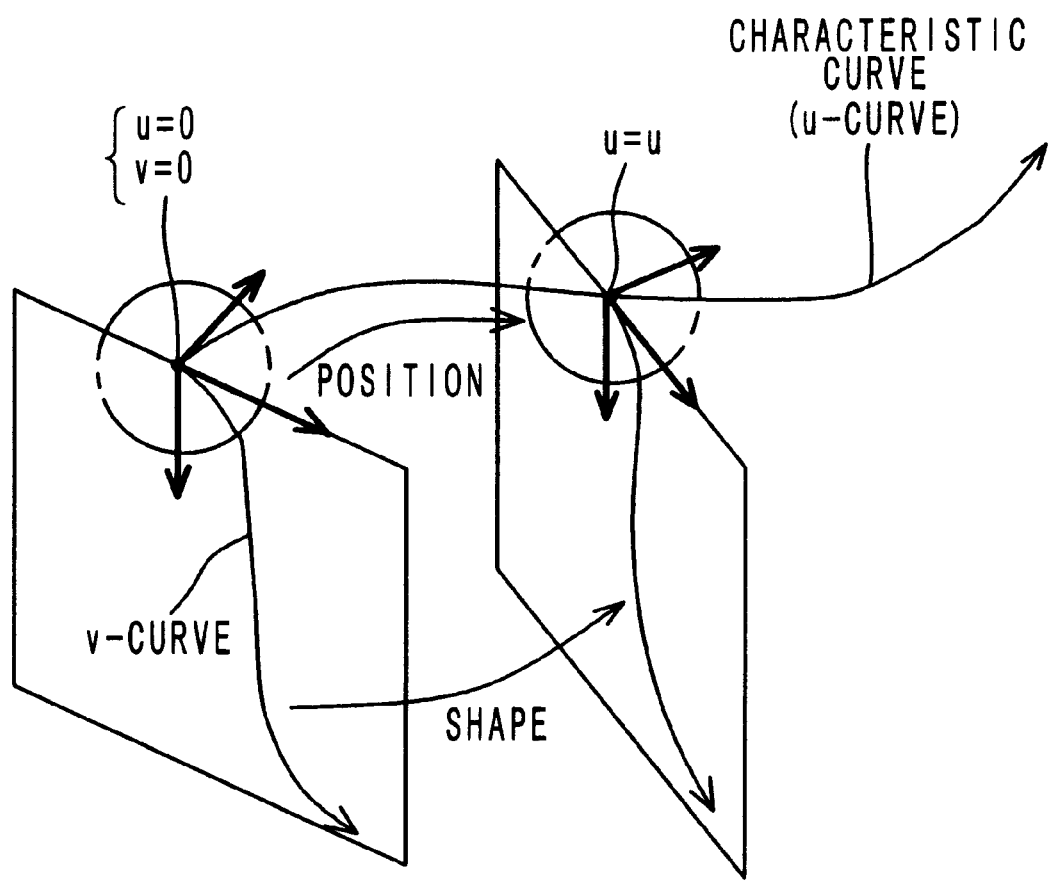

THREE-DIMENSIONAL MACHINING METHOD AND RECORDING MEDIUM STORED WITH A THREE-DIMENSIONAL MACHINING CONTROL PROGRAM

BACKGROUND OF THE INVENTION

1. Field of the Invention

The present invention relates to a three-dimensional machining method for machining a workpiece three-dimensionally with a machine tool such as a milling cutter, and more particularly to a processing control for defining a surface to be machined and generating paths of a cutting tool to machine the surface.

2. Description of Related Art

Recently, computerized three-dimensional machining of a metal workpiece has been developed for practical use. The three-dimensional machining is generally performed based on either paths of the working end of a ball tip of a cutting tool or paths of the center of the ball tip of the cutting tool.

In either method, conventionally, a plurality of surfaces to be machined are defined individually, and continuous surfaces are machined by transfer cutting. For example, as shown in FIGS. 7a and 7b, three continuous surfaces #i, #j and #k are defined individually (in individual coordinate systems (u, v)) and are machined continuously by transferring a cutting tool from a path to machine the surface #i to a path to machine the surface #k and then to a path to machine the surface #j. In the transfer cutting, generation of tool paths is sometimes performed based on a direction γ which does not reflect the characteristics of all the surfaces. In this case, the transfer cutting is not in accordance with the characteristics of the surfaces, and the cutting may be rough or may be unnecessarily minute and wasteful. Further, for transfer cutting, a large volume of processing to avoid interference of the cutting tool is necessary, which takes a lot of time.

In order to solve the above problems, the applicant suggested, in U.S. Pat. No. 5,515,290, a three-dimensional machining method wherein a plurality of curved surfaces which have distinct characteristics are defined as a unified surface by a group of polynomials with the fourth or less degree with respect to parameters u and v, and paths of a cutting tool to machine the unified surface are calculated by using the polynomials. According to this method, the solutions can be obtained arithmetically, and points on the unified curved surface expressed in the coordinate system (u, v) can be converted into values in the rectangular coordinate system (x, y, z) speedily and vice versa. However, curved surfaces are generally defined in forms of spline, B-spline, nurbus, etc. and are not always defined by polynomials, and therefore, in order to carry out calculation control in the above method using expressions in other forms, some conversion is necessary.

SUMMARY OF THE INVENTION

An object of the present invention is to provide a three-dimensional machining method wherein various forms of expressions to define curved surfaces can be taken in and unified into an expression, and speedy calculation for machining can be carried out.

In order to attain the object, a three-dimensional machining method according to the present invention comprises the steps of: inputting data about a plurality of curved surfaces which are expressed in various forms; defining the plurality of curved surfaces, based on the inputted data, by a set of rational functions with respect to parameters u and v; and calculating intersections which are necessary for machining from the rational functions. Any form of curved surface can be defined by a set of rational functions with respect to parameters u and v. Then, intersections are calculated from the rational functions, and paths of a cutting tool to machine the surface are calculated. This calculation is specifically to figure out the solutions of the rational functions. Algebraically, with respect to a polynomial with the fourth or less degree, a formula can be adopted to calculate the solution. However, there is no general formulas to calculate the solution of a polynomial with the fifth or more degree. Therefore, in order to calculate the solution of a rational function, an analytically focusing method is adopted. At this time, however, there are cases where the solution cannot be focused although the solution exists because of bad setting of an initial value. If the rational function is of the third or less degree, the rational function is a monotone function, and this problem does not have to be considered. However, generally, rational functions are not always monotone functions. Therefore, according to the present invention, first, the extremal value and the point of inflection of a rational function are calculated, and the solution is calculated with the initial value set between the extremal value and the point of inflection.

The use of rational functions brings about the following effects.

(1) Any forms of expressions to define curved surfaces can be unified into a set of rational functions with respect to parameters u and v. Thereby, the problems that various calculation methods must be adopted for handling the respective expressions and that handling of various forms of expressions which cannot be unified together causes an increase in the calculation time and deterioration in accuracy of machining can be solved.

(2) A plurality of curved surfaces can be unified together within tolerance. Even if inputted data about curved surfaces are of any forms, these data can be changed into those in a form. Then, data in the same form can be unified as a piece of data which expresses a single unified curved surface. Thus, when the shape to be created is defined by a plurality of curved surfaces, the number of surfaces to be handled is decreased, and the calculation time to figure out paths of a cutting tool can be shortened.

BRIEF DESCRIPTION OF THE DRAWINGS

This and other objects and features of the present invention will be apparent from the following description with reference to the accompanying drawings, in which:

FIG. 1 is a schematic view of a machining apparatus to carry out three-dimensional machining in a method according to the present invention;

FIG. 6 is an illustration of another way of defining a curved surface; and

DETAILED DESCRIPTION OF THE PREFERRED EMBODIMENTS

Figure 2:
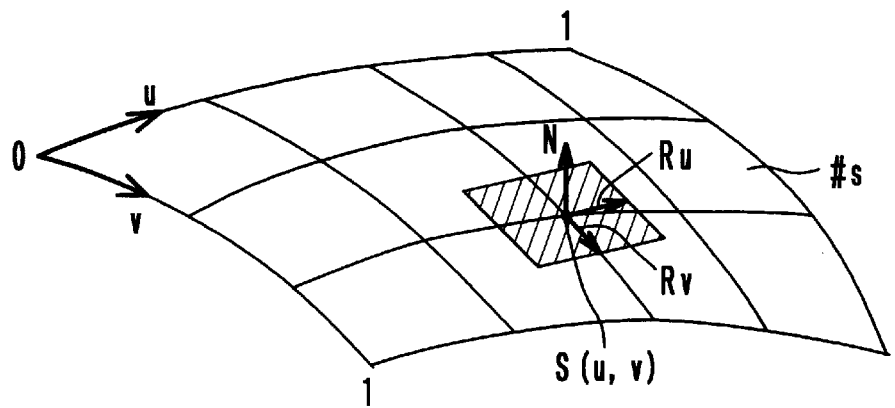
FIG. 2 is an illustration of a way of defining a curved surface.

An exemplary three-dimensional machining method according to the present invention is described with reference to the accompanying drawings.

Machining Apparatus

FIG. 1 shows the general structure of a machining apparatus to carry out three-dimensional machining according to the present invention. Numeral 1 denotes an apparatus body. The apparatus body 1 has a table 3 on a base 2 and a machining head 5 with a cutting tool 6 on a column 4. The table 3 is moved in the X direction and in the Y direction by an X-axis DC motor 10 and a Y-axis DC motor 11 respectively. The machining head 5 is moved in the Z direction by a Z-axis DC motor 12. The speed controls of these movements are carried out by sending control signals from control units 15, 16 and 17 to the motors 10, 11 and 12 respectively.

A graphic data processing system is composed of a 16-bit or 32-bit computer 20, a tape reader 21 and a control board 22. The tape reader 21 reads out NC data, specifically, G code as program format. The computer 20 receives graphic data in the forms of three plane views or a perspective view. The computer 20 transmits a control program stored in a floppy disc 20a to a CPU 24 and carries out operation as will be described later.

The control board 22 has an operation panel 23 and incorporates the CPU 24. The CPU 24 receives graphic data and other data from the computer 20 and the tape reader 21 through an input port a. The CPU 24 generates cutting data from the inputted graphic data and transmits the cutting data as control signals to the control units 15, 16 and 17 through output ports b, c and d respectively.

The generation of the cutting data in the CPU 24 is hereinafter described.

Curved Surface

As shown in FIG. 2, a curved surface #s is defined by two parameters u and v which are independent of the rectangular coordinate system. A standard (function) S to designate a point is determined with respect to the parameters u and v ($0 \leq u \leq 1$, $0 \leq v \leq 1$).

When the function S is differentiable (smooth), the function S expresses a curved surface. In this case, the tangential vector for the u direction and the tangential vector for the v direction with respect to a point on the curved surface #s can be expressed as follows:

$$\eta S/\eta u$$

$$\eta S/\eta v$$

Further, the twist vector can be expressed as follows:

$$\eta^2 S/\eta u \eta v$$

The cutting tool 6 has a ball tip which has a radius R. Accordingly, the center of the ball tip of the cutting tool 6 should be located at a distance R in the normal direction from the surface. In a case wherein machining is carried out based on paths of the center of the ball tip of the cutting tool 6, it is necessary to figure out the normal vectors with respect to points on the surface.

The tangential vector Ru for the u direction and the tangential vector Rv for the v direction with respect to a point S(u, v) on the curved surface #s are expressed as follows:

$$Ru = \frac{\eta S/\eta u}{|\eta S/\eta u|}$$

$$Rv = \frac{\eta S/\eta v}{|\eta S/\eta v|}$$

A plane including the point S(u, v) and the tangential vectors Ru and Rv is referred to as a tangential plane (shadowed in FIG. 2), and the normal vector N is calculated by N=Ru×Rv. In order to cut the point S(u, v), the center of the ball tip of the cutting tool must be located in a point P calculated as follows:

$$P = S(u, v) + \varepsilon \cdot R \cdot N \quad (1)$$

$$\varepsilon^2 = 1 \, (+1: \text{normal side}, \, -1: \text{abnormal side})$$

R: radius of the ball tip of the cutting tool

Since the curved surface #s is a differentiable function with respect to the parameters u and v, the function can be expressed as a rational function. Therefore, in order to figure out a point on the curved surface #s, the solution of the rational function is calculated.

For example, if a curved surface #a is defined as a cubic spline curved surface by the following expression (2) and if a curved surface #b is defined by the following expression (3), the expressions (2) and (3) can be unified into a rational function (4).

$$a(u, v) = \sum_{j=0}^{3} \sum_{i=0}^{3} a_{ji} u^j v^i \quad (2)$$

$$b(u, v) = \frac{\sum_{j=0}^{3} \sum_{i=0}^{4} b_{ji} u^j v^i}{\sum_{j=0}^{3} \sum_{i=0}^{4} b'_{ji} u^j v^i} \quad (3)$$

$$S(u, v) = \frac{f(u, v)}{g(u, v)} \quad (4)$$

$$f(u, v) = \sum_{j=0}^{n} \sum_{i=0}^{m} a_{ji} u^j v^i$$

$$g(u, v) = \sum_{j=0}^{n'} \sum_{i=0}^{m'} b_{ji} u^j v^i$$

a → g(u, v) = 1, f(u, v), u = 3, v = 3
b → n = 3, m = 4, u' = 3, v' = 4

Figure 3:
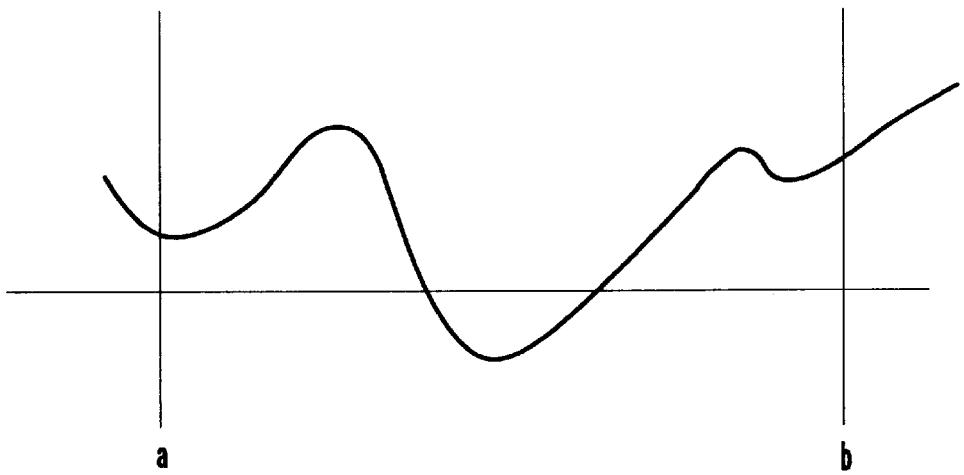
FIG. 3 is a graph showing an analytical method for figuring out the solution of a rational function.

FIG. 3 is a graph showing the rational function (4), and the solution is figured out within a range [a, b]. For the calculation, an analytically focusing method is adopted. More specifically, the extremal value and the point of inflection of the rational function are figured out, and the solution is calculated with the initial value set at a point between the extremal value and the point of inflection.

With this process, any forms of expressions can be unified into an expression with respect to parameters u and v, thereby increasing the processing speed and improving the accuracy of machining.

Figure 4:
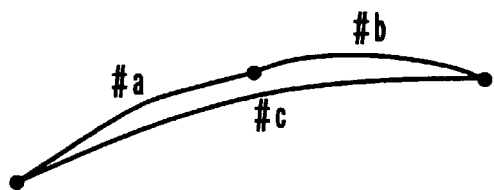
FIG. 4 is an illustration showing unification of a plurality of curved surfaces.

A curved surface is expressed by a rational function, and a plurality of curved surfaces are defined by rational functions with respect to parameters u and v which are peculiar to the respective surfaces. Accordingly, even rational functions of the same form express different curved surfaces because the parameters u and v of the rational functions are different. However, according to the present invention, a plurality of continuous curved surfaces are defined by rational functions with respect to the same parameters u and v, and then, the continuous curved surfaces are unified into a single surface. For example, as shown in FIG. 4, curved surfaces #a and #b which are expressed by rational functions of the same form are unified into a curved surface #c which is expressed by a single rational function. In this way, the number of curved surfaces is decreased, and the calculation time is shortened.

Definition of Curved Surfaces

A curved surface is defined strictly based on graphic data, such as three plane views and a perspective view, provided by the designer. In the views, outline curves and sectional curves of the surface are provided. From these data, a curved surface definition net is made to embody the curved surface imaged by the designer. The curved surface definition net is composed of many lattice points, and using the definition net, the curved surface is divided into a necessary number of patches. First, rational functions to express the respective patches are determined individually, and from the rational functions, a set of rational functions to express the whole curved surface is determined.

In defining continuous curved surfaces, first, a curved surface definition net is made based on rational functions which express the respective surfaces. Then, by using the curved surface definition net, the continuous curved surfaces are unified into a single surface, and the unified surface is expressed by a set of rational functions.

Figure 5:
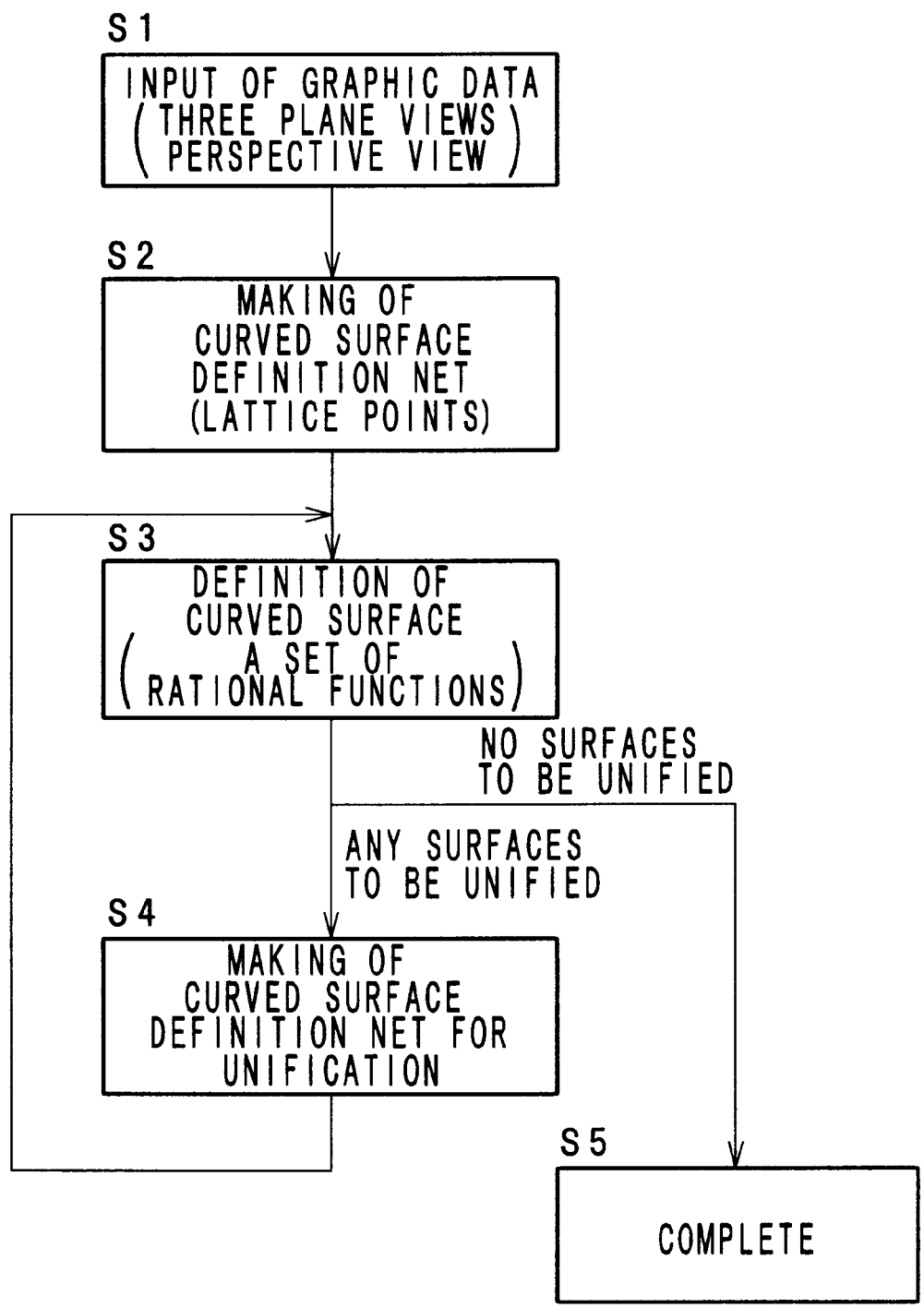
FIG. 5 is a flowchart showing a procedure in the method of the present invention.
Figure 7A:
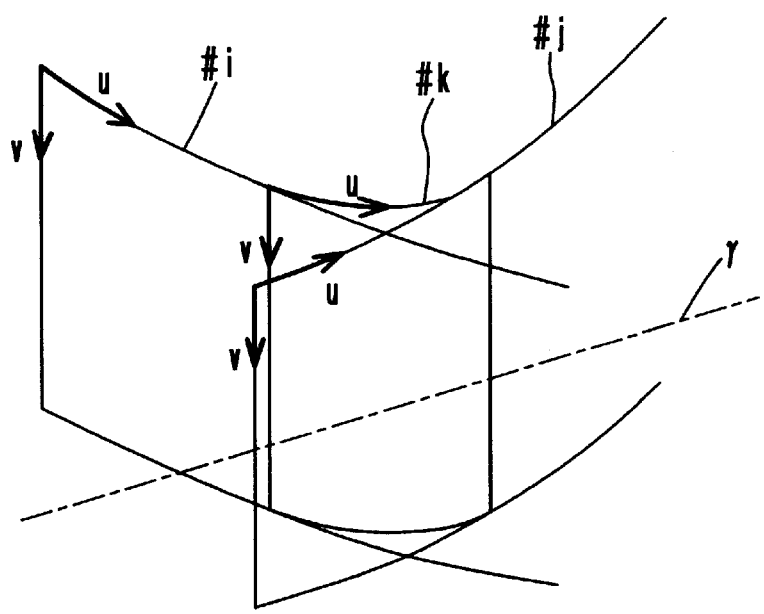
FIGS. 7a and 7b are illustrations of machining of continuous curved surfaces in a conventional three-dimensional machining method.
Figure 7B:
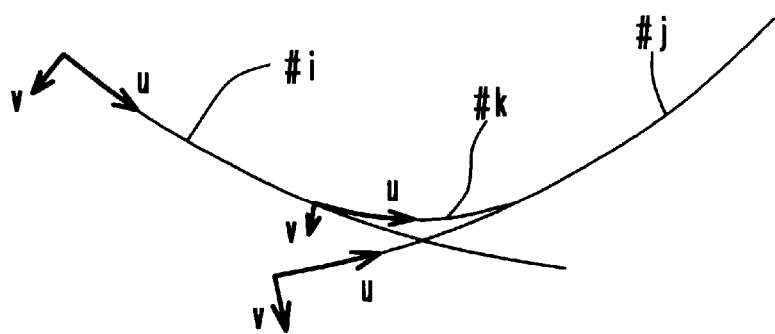

FIG. 5 shows the procedure for definition of continuous curved surfaces. At step S1, graphic data provided by the designer are inputted, and at step S2, a curved surface definition net is made. At step S3, a set of rational functions to express the curved surface is determined based on the curved surface definition net. If there are no other surfaces to be unified with the defined curved surface, the procedure is completed at step S5. If there are any surfaces to be unified with the defined curved surface, a curved surface definition net is made with respect to the surfaces to be unified at step S4, and a set of rational functions to express the continuous surfaces as a unified surface is determined at step S3.

1. Curved Surface Definition Net

A curved surface is defined from curves which are provided as graphic data by the designer. To recognize the shape of the curved surface, a curved surface definition net is made of many lattice points. The curved surface is divided by u-curves and v-curves in a u direction and in a v direction which are peculiar to the surface. Supposing that the number of u-curves and the number of v-curves are m and n respectively, intersections of the u curves and the v curves are expressed as follows:

$$u_o=0<u_1<\ldots<u_m=1$$

$$v_o=0<v_1<\ldots<v_n=1$$

With respect to each of the intersections $S(u_j, V_i)$, the tangential vector for the u direction $Su(u_j, vi)$, the tangential vector for the v direction $Sv(u_j, V_i)$ and the twist vector $Suv(u_j, V_i)$ are determined. At that time, the tangential vectors and the twist vector are figured out based on:

$$Su(u, v)=\eta S/\eta u$$

$$Sv(u, v)=\eta S/\eta v$$

$$Suv(u, v)=\eta^2 S/\eta u \eta v.$$

In order to make such a curved surface definition net, a differentiable standard (function) with respect to the parameters u and v is determined. As shown in FIG. 6, a curved surface is regarded to be made by moving a v-curve along a u-curve changing its shape. When the provided graphic data include a sectional curve, the sectional curve is handled as the v-curve. The v-curve is regarded to move along the u-curve changing its shape differentiably, and a differentiable function S is determined from the u-curve and the v-curve. Then, a point S(u, v) is defined by the function S, and the tangential vector Su for the u direction, the tangential vector Sv for the v direction and the twist vector Suv with respect to the point S(u, v) are calculated. Thus, the v-curve changes its shape and its position with respect to the u-curve. In other words, a matrix (directions) which determines the shape and the position changes differentiably.

Within a range $0 \leq u \leq 1$ and $0 \leq v \leq 1$, points on the surface can be defined by the function S, and a curved surface definition net is composed of these points.

2. Rational Functions to Express a Curved Surface

Based on the curved surface definition net, the shape of each patch to be machined is determined, and in each patch expressed by $u_{j-1} \leq u \leq u_j$ and $v_{i-1} \leq v \leq v_i$, a rational function $S_{ji}$ with respect to parameters u and v is figured out. By combining the rational functions $S_{ji}$ which express the respective patches, the curved surface is defined. In figuring out the rational functions, the following conditions must be fulfilled:

(1) the rational functions must meet the provided graphic data, and more particularly must meet curves and values (dimensions, angles, etc.) shown in the provided drawings; and (2) the rational functions must sufficiently meet the designer's intention, that is, must express the sufficiently accurate surface as designed.

When a curved surface is defined as a combination of rational functions which express the respective patches of the curved surface, the rational functions must be differentiable at the borders among the patches. According to the present invention, with respect to each lattice point $S(u_j, v_i)$ of the curved surface definition net, the tangential vector $Su(u_j, v_i)$ for the u direction, the tangential vector $Sv(u_j, v_i)$ for the v direction and the twist vector $Suv(u_j, v_i)$ are calculated. Based on the vectors Su, Sv and Suv with respect to the respective lattice points (border points), rational functions to express the respective patches are determined. The rational functions obtained in this way are differentiable at the borders.

The provided graphic data sometimes include only some passing points. In this case, it is impossible to calculate the vectors Su, Sv, and Suv from the provided data. In this case, a rational function to express a patch is determined in consideration for the neighboring patches. In other words, a set of rational functions to express the curved surface is determined in consideration for the mutual relationships among the patches.

3. Unification of Continuous Curved Surfaces

Any curved surface is defined in a coordinate system which reflects the characteristics of the surface. In a conventional method, curved surfaces which have distinct characteristics are defined as separate curved surfaces. Therefore, when a complicated shape is to be machined, a large number of curved surfaces must be defined, thereby increasing the volume of processing. According to the present invention, continuous curved surfaces which have distinct characteristics are unified into a single curved surface and expressed by a set of rational functions.

Now, suppose that continuous curved surfaces S and S' are expressed by a set of rational functions with respect to parameters u and v and by a set of rational functions with respect to parameters u' and v' respectively. If a u-curve of the curved surface S intersects the curved surface S' at a point P(u, v) (0≦u), the intersection P can be also expressed by the parameters of the curved surface S' as P=S'(u', v'). Here, [Su(u, v), S'u(u', v')]≧[Sv(u, v), S'v(u', v')] is supposed. The u-curve of the surface S is connected to a u'-curve of the surface S' at the intersection P. Consequently, a curve which includes the u-curve of the curved surface S from u=0 to u=u and the u'-curve of the curved surface S' from u=u' to u=1 is newly made. In the same manner, a number n of curves are made, and every curve is divided into a number m of sections. Thus, a curved surface definition net with respect to the curved surfaces S and S' is made. Based on the curved surface definition net, the curved surfaces S and S' can be defined as a single curved surface, and moreover, the newly defined curved surface keeps the characteristics of both the surfaces S and S'.

Paths of the Cutting Tool

After the definition of a curved surface, the cutting tool 6 moves to machine the curved surface. The cutting tool 6 has a ball tip of a radius R, and the center of the ball tip should be located at a distance R vertically from the surface. The location of the center P of the ball tip is calculated by the aforementioned expression (1).

In moving the cutting tool 6 along a curve on a curved surface S, a path of the center of the ball tip of the tool 6 is generated by calculating points P at the distance R from the curve by using the expression (1). In a conventional method, with respect to every cutter location, a point P at the distance R in the normal direction, that is, the normal vector N (see FIG. 2) is calculated. When the curved surface S is not expressed by an expression, in order to calculate the normal vector N with respect to a cutter location, other two points must be figured out. For these reasons, generation of paths of the center of the ball tip in a conventional method is complicated and takes a long time.

However, according to the present invention, with respect to only the intersections $(u_j, v_i)$ of u-curves and v-curves which form the curved surface definition net, points P at the distance R in the normal direction are calculated by using the expression (1). Then, from the points P, a curved surface definition net for an offset surface *S of the surface S is made. Based on the curved surface definition net, a set of rational functions to express the offset surface *S on which the center of the ball tip moves is determined. The rational functions must meet the following condition:

$$*S(u, v) = S(u, v) + \epsilon \cdot R \cdot N (0 \leq u \leq 1, 0 \leq v \leq 1) \quad (5)$$

The rational functions calculated according to the present invention meet the condition within an allowable error. It is no longer necessary to calculate a large number of points P at a distance R from the surface S by using the expression (1). In the present method, paths of the center of the ball tip of the cutting tool are generated by calculating points *S(u, v) on the offset surface *S by using the rational functions, which is easy and increases the processing speed.

Although the present invention has been described in connection with the preferred embodiment, it is to be noted that various changes and modifications are possible to those who are skilled in the art. Such changes and modifications are to be understood as being within the scope of the present invention.

What is claimed is:

1. A three-dimensional machining method for machining a workpiece in mutually rectangular directions along an x-axis, a y-axis and a z-axis with a programmed computer, the method comprising the steps of:

inputting data about a plurality of curved surfaces and curves which are expressed in a plurality of forms;

defining the plurality of curved surfaces, based on the inputted data, by a set of rational functions with respect to parameters u and v wherein 0<u<1 and 0≦v≦1; and calculating intersections which are necessary for machining from the rational functions, wherein the step of calculating intersections comprises:
figuring out an extremal value and a point of inflection of the set of rational functions; and
calculating a solution of the rational functions by setting an initial value between the extremal value and the point of inflection.

2. A three-dimensional machining method as claimed in claim 1, wherein when the plurality of curved surfaces are expressed in a same form, the curved surfaces are unified into a single surface.

3. A three-dimensional machining method as claimed in claim 1, wherein with respect to a point S(u, v) calculated by using the rational functions, a position P of a center of a ball tip with a radius R of a cutting tool to machine the point S(u, v) is calculated as follows:

$$P = S(u, v) + \epsilon \cdot R \cdot N$$

wherein N denotes a normal vector, and $\epsilon^2 = 1$, where +1 indicates a normal side and −1 indicates an abnormal side.

4. A medium which is stored with a three-dimensional machining control program and is used for computerized three dimensional machining of a workpiece, the program comprising the steps of:

receiving data about a plurality of curved surfaces and curves which are expressed in a plurality of forms;

defining the plurality of curved surfaces, based on the data, by a set of rational functions with respect to parameters u and v wherein 0≦u≦1 and 0<v<1; and calculating intersections which are necessary for machining from the rational functions, wherein the step of calculating intersections comprises:
figuring out an extremal value and a point of inflection of the set of rational functions; and
calculating a solution of the rational functions by setting an initial value between the extremal value and the point of inflection.

* * * * *